United States Patent Office 3,465,858
Patented Sept. 9, 1969

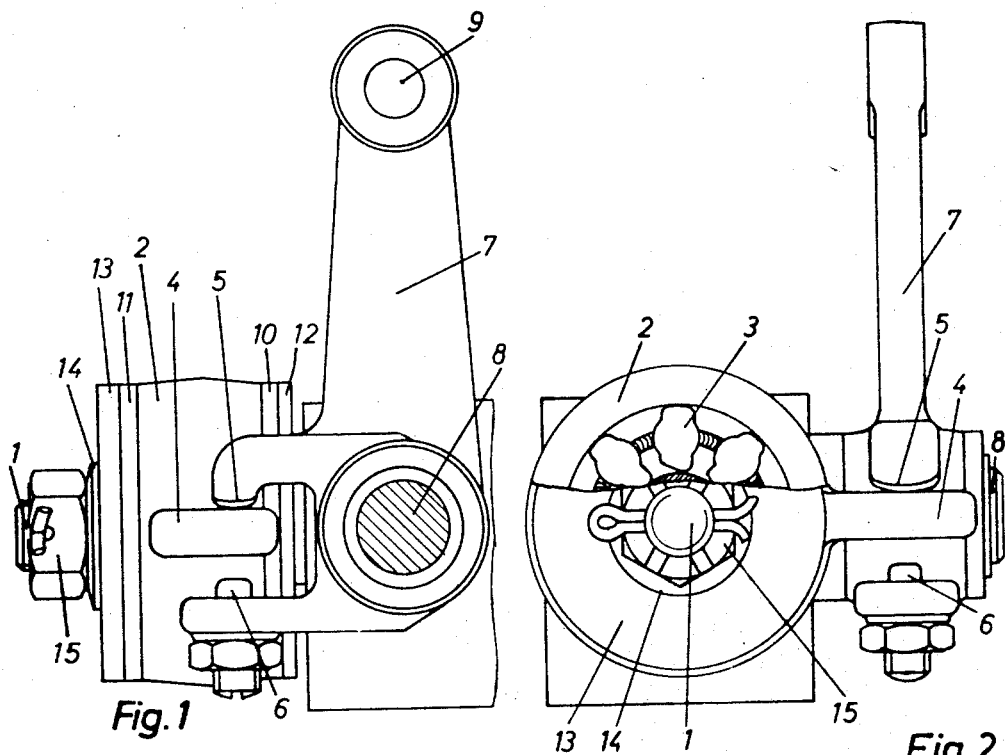
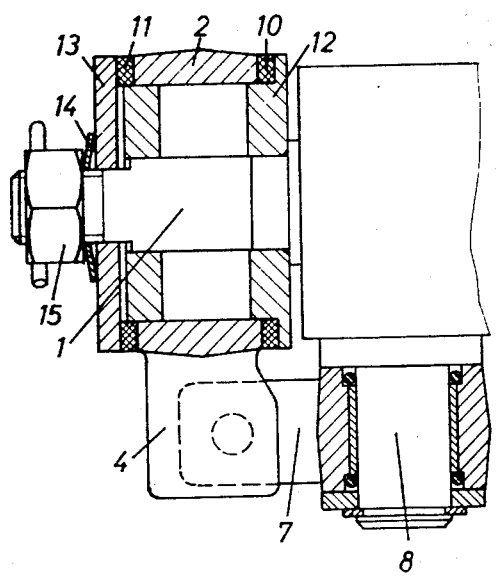

3,465,858
FREE WHEEL CLUTCH
Erich Reinecke, Hannover, Germany, assignor to Westinghouse Bremsen- und Apparatebau G.m.b.H., Hannover Germany
Filed Apr. 12, 1968, Ser. No. 720,823
Claims priority, application Germany, Apr. 21, 1967, W 39,583
Int. Cl. F16d 23/00, 43/00, 13/04
U.S. Cl. 192—45.1      2 Claims

ABSTRACT OF THE DISCLOSURE

A free-wheel clutch in which an annular member is supported concentrically relative to a shaft by disc-shaped shaft followers axially displaceable on the shaft, the annular member being rotated by a lever in a first direction about its axis to pivot clamping bodies into engagement with the shaft to thereby lock the shaft to the annular member for rotation together, and rotated in the reverse direction by the lever to reversely pivot the clamping bodies to unlock the annular member relative to the shaft and enable reverse rotation of the annular member without rotating the shaft; the rotation of the annular member relative to the shaft is adjustably frictionally impeded by a nut and spring washer on the shaft engaging one of the axially movable shaft followers to axially compress annular friction members between the followers and the opposite ends of the annular member, thereby preventing undesired rotation of the annular member relative to the shaft due to shock and vibration when the annular member is disengaged from the operating lever during free play relationship therebetween, the annular friction members also serving to seal the clutch to prevent ingress of dirt.

Background of invention

Heretofore, in clutch devices having lever operated annular member means rotatable about its axis in a first direction to pivot internally mounted clamping bodies into clutching engagement with a concentrically mounted shaft to rotate the shaft therewith, and rotatable in the reverse direction to reverse pivotal movement of the clamping bodies to release the shaft to provide movement of the annular member without rotation of the shaft therewith, the annular member was susceptible to undesired rotation thereof relative to the shaft caused by shock and vibration when the lever means on the annular member was disposed in the free play area between the spaced projections on the prime operating lever, thus effecting undesired clamping or unclamping of the clamping bodies relative to the shaft.

Summary of invention

It is the object of the present invention to provide in a clutch device of the type described, means for providing adjustable frictional force to impede relative movement between the shaft and the annular member to prevent undesired movement of the annular member relative to the shaft during the period of disengagement between the annular member and the operating lever, and at the same time, utilize the adjustable frictional means to seal the clutch device against ingress of dirt and dust.

In the present invention, this object is achieved by providing disc-shaped shaft follower members to support the annular member concentrically relative to the shaft and the clamping bodies disposed between the shaft and the annular member. The follower members are keyed to the shaft for rotation therewith an axial movement therealong, one of the follower discs engaging an axial stop shoulder on the shaft. An annular member of friction material is disposed axially between each end of the annular member and one of the follower members, the follower members being adjustably movable toward one another axially of the shaft to compress the friction material a desired amount to assure fixed relationship between the annular member and the followers and the shaft when the annular member is disengaged from the operating lever, and yet provide for rotational movement between the annular member and the followers and the shaft in response to operation of the operating lever. Adjustment of the frictional force upon the friction material to impede movement between the annular member and the follower discs is effected by a nut threaded on the end of the shaft and operable to compress a spring washer axially against the outermost follower member, which force is transmitted axially through the friction members, the annular member and the followers to be opposed by the stop on the shaft, thus compressing the annular frictional members a desired amount according to the adjustment of the nut.

This and other objects of the invention will become more readily apparent in the following description, taken with the drawing, in which:

FIG. 1 is a side elevational view of the clutch type shaft coupling means of the present invention;

FIG. 2 is a side elevational view thereof taken from the left of FIG. 1 and shown partially in section; and FIG. 3 is a partial sectional view thereof taken from the top of FIG. 2, with portions omitted for convenience of illustration.

Referring now to the drawings, it will be seen that the free-wheel coupling or clutch comprises an annular member or ring 2 having disposed therein a plurality of circumferentially spaced clamping bodies 3. The ring 2 includes thereon a radially extending lever 4 movable with axial rotation of the annular member 2 between spaced projections 5 and 6 of an operating lever 7, the latter disposed for pivotal movement about a stud 8 on the main body member by means of linkage, not shown, engaged with bore 9.

To frictionally impede axial rotation of ring 2, there is provided on the opposite sides of ring 2 frictional linings 10 and 11 in the form of ring members, each lining 10 and 11 disposed axially between the corresponding side of the ring 2 and one of a pair of follower discs 12 and 13, respectively, which discs are disposed on the shaft 1 for axial movement therealong and rotational movement therewith.

In order to axially move the follower discs 12 and 13 toward one another to compress the frictional members 10 and 11 against the ends of ring 2, there is provided a nut 15 on the end of shaft 1 for adjustably compressing a spring washer 14 against follower disc 13, the spring force being transmitted through frictional member 11, ring 2, frictional member 10 and follower 12 against a stop shoulder on the shaft 1, thereby adjusting the frictional force impeding movement between the ring 2 and the follower discs 12 and 13. The follower discs 12 and 13 and friction linings 10 and 11 combine to seal the interior of ring 2 against ingress of dirt, dust and other impurities.

In now describing the operation of the device, if the lever 7 is rotated counterclockwise in FIG. 1, projection 5 engages lever 4 which rotates ring 2 in a clockwise direction as viewed in FIG. 2 to initially pivot clamping bodies 3 into clamping engagement with shaft 1, and, upon further movement of lever 4 in the same direction, rotates shaft 1 clockwise until movement of lever 7 ceases.

Conversely, clockwise movement of lever 7 as viewed in FIG. 1, rotates ring member 2 counterclockwise as viewed in FIG. 2 to initially pivot clamping members 3 in the reverse direction to release shaft 1 relative to ring member 2, and provide for further counterclockwise movement of ring member 2 without rotating shaft 1.

The axial pressure on frictional linings 10 and 11 may be increased by axial adjustment of nut 15 to provide sufficient frictional force between ring 2 and shaft 1 by way of follower discs 12 and 13 so that when lever 7 is positioned to disengage both projections 5 and 6 relative to lever 4, shock and vibration will be insufficient to effect undesired rotational movement of ring 2 relative to shaft 1.

Having now described the invention, what I claim as new and desire to secure by Letters Patent, is:

1. A free-wheel clutch device including an axially rotatable ring member, an axially rotatable shaft, means supporting the ring member concentrically with said shaft, and means for releasably locking the shaft to the ring member for rotation therewith in only one direction of rotation of the ring member;
   (a) said means for supporting said ring member concentrically with said shaft including a pair of axially spaced disc members coaxially supported on said shaft for rotation therewith, one of said pair of disc members axially movable on said shaft into engagement with a stop shoulder on said shaft, and the other of said pair of disc members axially movable relative to said one disc member;
   (b) adjustable spring means for resiliently biasing said other disc member axially toward said one disc member; and
   (c) resilient friction ring means disposed axially between each of said pair of disc members and said ring member.

2. A free-wheel clutch device, as recited in claim 1, in which said adjustable spring means comprises:
   (a) a nut threaded for axial movement along said shaft; and
   (b) a spring member axially compressible between said nut and said other of said pair of disc members.

References Cited

UNITED STATES PATENTS

| | | | |
|---|---|---|---|
| 2,427,120 | 9/1947 | Blair | 192—45.1 XR |
| 2,427,153 | 9/1947 | Mossberg | 81—63 XR |
| 3,068,978 | 12/1962 | Christenson | 192—45 |

CARLTON R. CROYLE, Primary Examiner

A. D. HERRMANN, Assistant Examiner

U.S. Cl. X.R.

192—47